(12) United States Patent
Mizobuchi

(10) Patent No.: US 11,700,449 B2
(45) Date of Patent: Jul. 11, 2023

(54) COMMUNICATION APPARATUS FOR WIRELESSLY COMMUNICATING WITH IMAGING APPARATUS, CONTROL METHOD OF COMMUNICATION APPARATUS, AND RECORDING MEDIUM

(71) Applicant: CANON KABUSHIKI KAISHA, Tokyo (JP)

(72) Inventor: Yasuhiro Mizobuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/481,129

(22) Filed: Sep. 21, 2021

(65) Prior Publication Data
US 2022/0094839 A1    Mar. 24, 2022

(30) Foreign Application Priority Data

Sep. 24, 2020  (JP) ................................. 2020-160152

(51) Int. Cl.
*H04N 23/661* (2023.01)
*H04N 5/76* (2006.01)
*H04N 23/667* (2023.01)
*H04W 4/80* (2018.01)
*H04N 23/50* (2023.01)
*H04N 23/66* (2023.01)

(52) U.S. Cl.
CPC ............. *H04N 23/661* (2023.01); *H04N 5/76* (2013.01)

(58) Field of Classification Search
CPC .. H04N 5/23206; H04N 5/76; H04N 5/23245; H04N 5/2251; H04N 5/23203; H04W 4/80
See application file for complete search history.

(56) References Cited

U.S. PATENT DOCUMENTS

| | | | |
|---|---|---|---|
| 2015/0346834 A1* | 12/2015 | Martinez Fernandez ..................... | |
| | | | G06F 3/017 |
| | | | 340/12.5 |
| 2016/0100394 A1* | 4/2016 | Tachiwa .................. | H04W 4/80 |
| | | | 370/329 |
| 2016/0366290 A1 | 12/2016 | Hoshino | |
| 2018/0191893 A1* | 7/2018 | Shinomiya ........ | H04M 1/72463 |
| 2019/0132505 A1* | 5/2019 | Ohgishi ............. | H04N 5/23203 |
| 2019/0394638 A1 | 12/2019 | Iida | |

FOREIGN PATENT DOCUMENTS

JP           2020092354 A      6/2020

* cited by examiner

*Primary Examiner* — Christopher K Peterson
(74) *Attorney, Agent, or Firm* — Canon U.S.A., Inc. IP Division

(57) ABSTRACT

A communication apparatus includes a first communication unit configured to wirelessly communicate with an imaging apparatus, a second communication unit configured to wirelessly communicate with the imaging apparatus, a reception unit configured to receive a notification from the imaging apparatus, and a control unit configured to control, based on whether the notification is received via the first communication unit or the second communication unit, whether to perform outputting a notification including at least a portion of an image received from the imaging apparatus or outputting a notification not including the image received from the imaging apparatus.

11 Claims, 14 Drawing Sheets

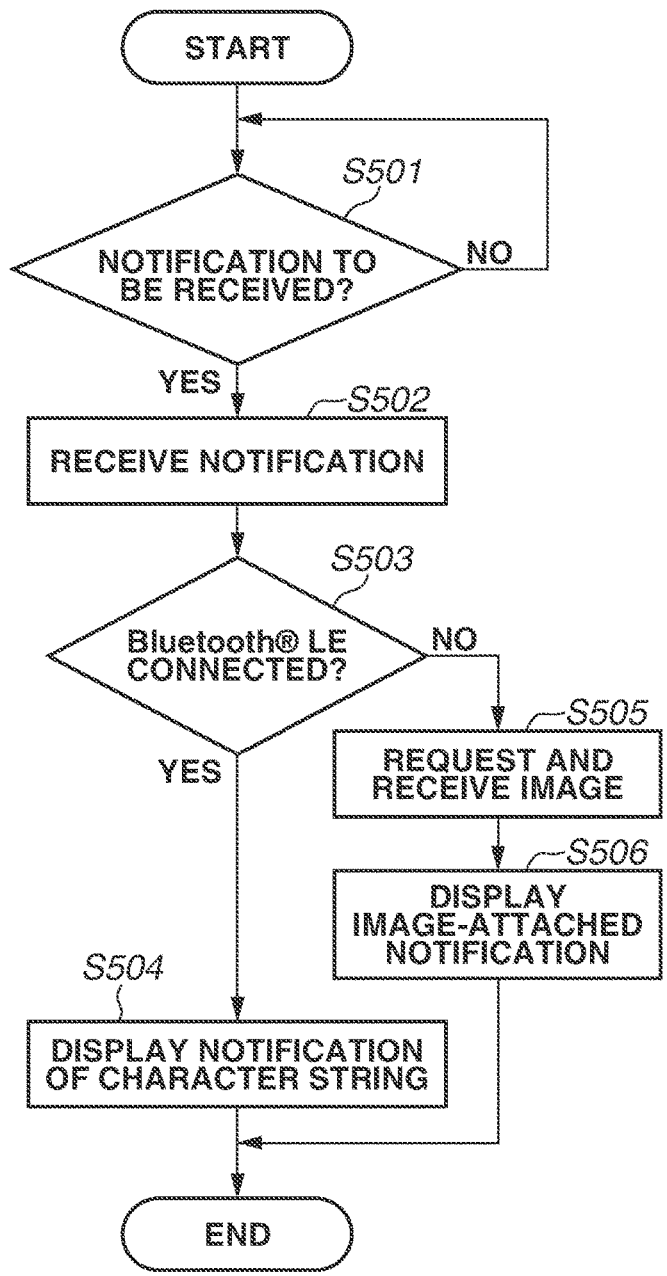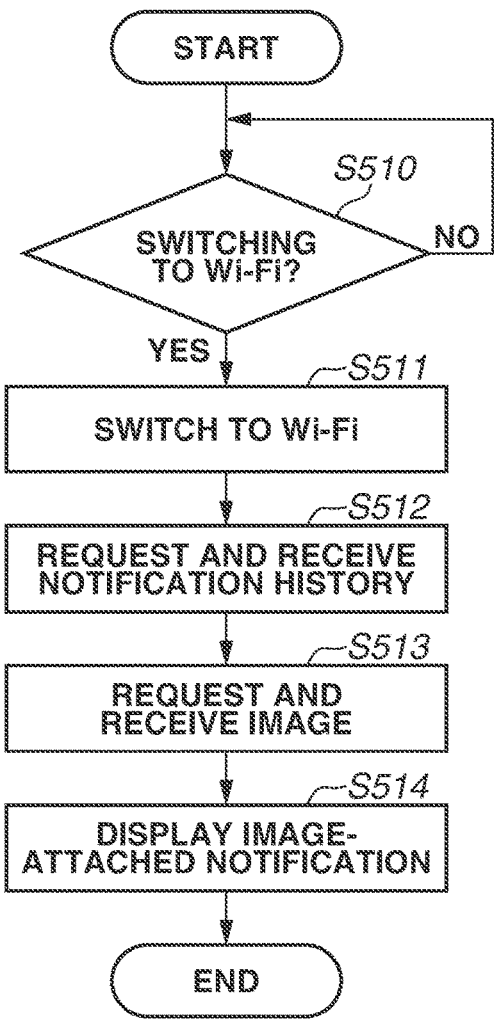

FIG.6

| NOTIFICATION NUMBER | OCCURRENCE DATE AND TIME | IMAGE ID | ... |
|---|---|---|---|
| 2 | 2020/7/3 10:00 | 1234567 | |
| 1 | 2020/7/2 10:00 | | |
| 3 | 2020/7/1 10:00 | 2345678 | |
| ⋮ | ⋮ | | |

FIG.7

| ITEM | NOTIFICATION NUMBER | OCCURRENCE DATE AND TIME | DIRECTORY NUMBER | FILE NUMBER | ... |
|---|---|---|---|---|---|
| DATA AMOUNT | 32 bit | 32 bit | 16 bit | 16 bit | |
| NOTIFICATION CONTENTS | 2 | 15950000000 | 100 | 1 | |

FIG.8

```
{
    "notifyno": 2,
    "date": "Wed, 01 Feb 2018 23:34:51 -0100",
    "imageid: "DCIM/100aaaaa/IMG_0001.JPG"
}
```

FIG.9

| NOTIFICATION NUMBER | NOTIFICATION CHARACTER STRING |
|---|---|
| 1 | BATTERY IS RUNNING LOW. |
| 2 | YOU HAVE GOT A GOOD PHOTO! |
| 3 | SUBJECT IS BACKLIGHTED. |
| . . . | . . . |

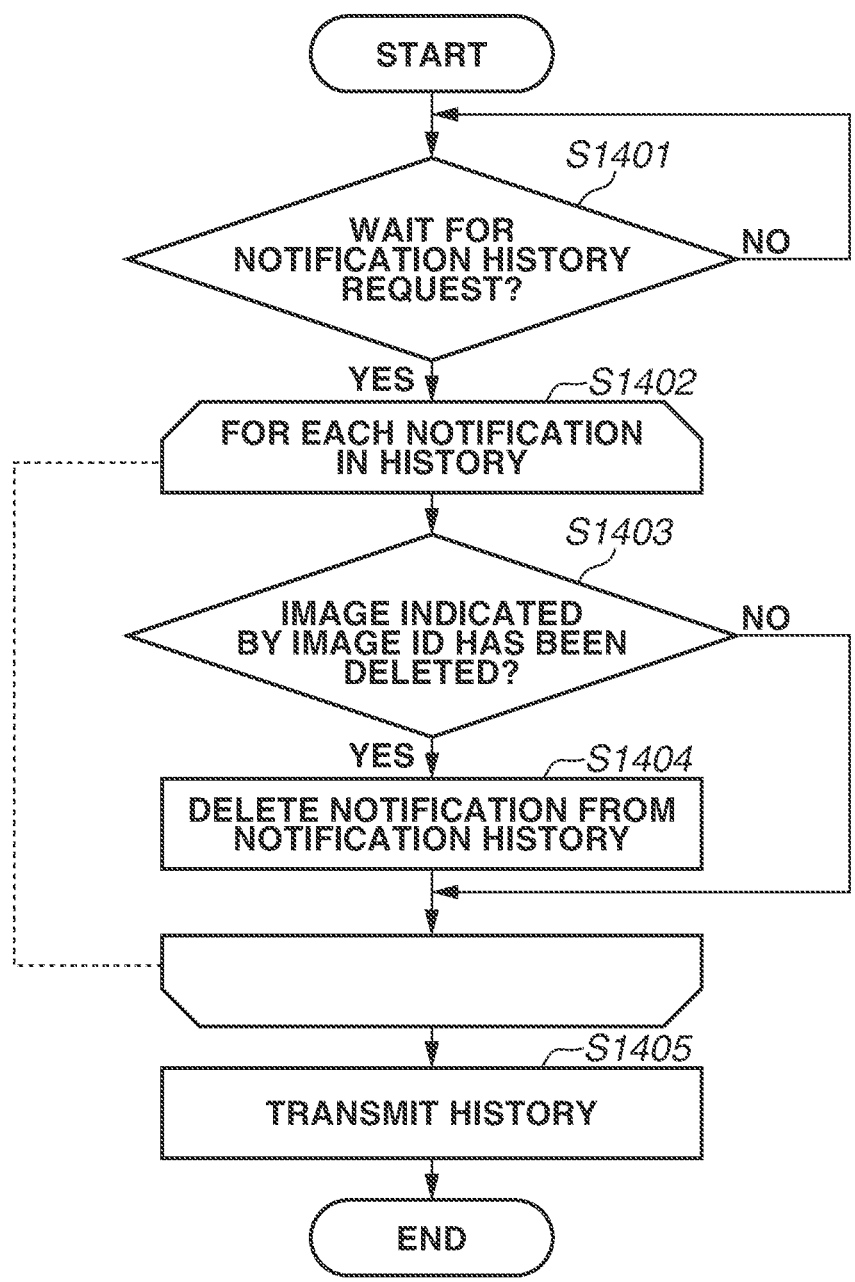

COMMUNICATION APPARATUS FOR WIRELESSLY COMMUNICATING WITH IMAGING APPARATUS, CONTROL METHOD OF COMMUNICATION APPARATUS, AND RECORDING MEDIUM

BACKGROUND OF THE INVENTION

Field of the Invention

The present invention relates to a communication apparatus configured to wirelessly communicate with an imaging apparatus.

Description of the Related Art

In recent years, some automatic image capturing cameras have been known to capture images regularly and continuously without image capturing instructions from users. For example, Japanese Patent Application Laid-Open No. 2020-92354 discusses an apparatus including a pan-tilt mechanism that automatically searches for a subject and automatically captures an image of the subject. Since such an apparatus as discussed in Japanese Patent Application Laid-Open No. 2020-92354 automatically captures an image based on determination performed by the camera, it is difficult for the user to observe from outside the apparatus in real time that image capturing has been performed. Thus, for example, when a wireless connection is established, the user may be notified of what image capturing has been performed.

However, if a notification is not appropriately performed in accordance with a communication path through which the notification is transmitted, it may take too much time until when the notification is displayed and displaying the notification can be no longer necessary.

SUMMARY OF THE INVENTION

According to an aspect of the present invention, a communication apparatus includes a first communication unit configured to wirelessly communicate with an imaging apparatus, a second communication unit configured to wirelessly communicate with the imaging apparatus, a reception unit configured to receive a notification from the imaging apparatus, and a control unit configured to control, based on whether the notification is received via the first communication unit or the second communication unit, whether to perform outputting a notification including at least a portion of an image received from the imaging apparatus or outputting a notification not including the image received from the imaging apparatus.

Further features of the present invention will become apparent from the following description of embodiments with reference to the attached drawings.

BRIEF DESCRIPTION OF THE DRAWINGS

FIG. 5A is a flowchart illustrating a processing procedure of receiving notification by the communication apparatus according to the first embodiment of the present invention. FIG. 5B is a flowchart illustrating a processing procedure of switching a communication path from Bluetooth® LE to Wi-Fi by the communication apparatus according to the first embodiment of the present invention.

FIG. 6 is a diagram describing a notification history according to the first embodiment of the present invention.

FIG. 7 is a diagram illustrating a notification Bluetooth® Low Energy (LE) message according to the first embodiment of the present invention.

FIG. 8 is a diagram illustrating a notification Wi-Fi message according to the first embodiment of the present invention.

FIG. 9 is a diagram illustrating interpretation of notification character string according to the first embodiment of the present invention.

FIG. 14 is a flowchart illustrating a processing procedure of deleting a notification from a notification history according to a third embodiment of the present invention.

DESCRIPTION OF THE EMBODIMENTS

Hereinafter, embodiments of the present invention will be described in detail with reference to the accompanying drawings.

A description will be given of communication system according to a first embodiment including a camera as an imaging apparatus 100 for transmitting and displaying an image-attached notification and a smartphone as a communication apparatus 110. Communication procedures before and after switching a communication path between a first communication path and a second communication path will also be described.

Figure 1:
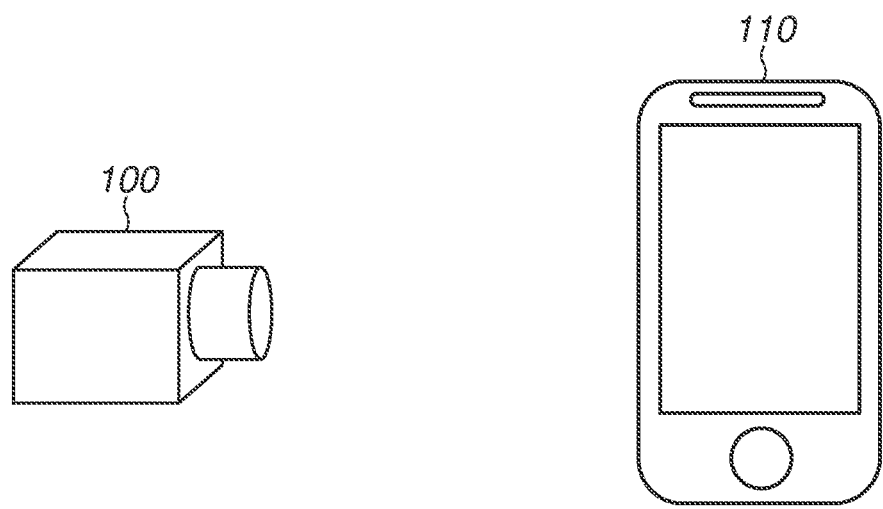
FIG. 1 is a schematic view diagram illustrating an imaging apparatus and a communication apparatus according to a first embodiment of the present invention.

FIG. 1 is a schematic view of the imaging apparatus 100 and the communication apparatus 110. The imaging apparatus 100 and the communication apparatus 110 each include a Bluetooth® communication module and a wireless LAN communication module, and communicate with each other via a connection using a wireless communication system described below. In the following description, a digital camera is taken as an example of the imaging apparatus 100, but the imaging apparatus 100 is not limited to a digital camera. The imaging apparatus 100 may be, for example, a mobile media player or an information processing apparatus, such as a tablet device or a personal computer. In the following description, a smartphone is taken as an example of the communication apparatus 110, but the communication apparatus 110 is not limited to a smartphone. The communication apparatus 110 may be, for example, a mobile media player or an information processing apparatus, such as a tablet device or a personal computer.

Figure 2:
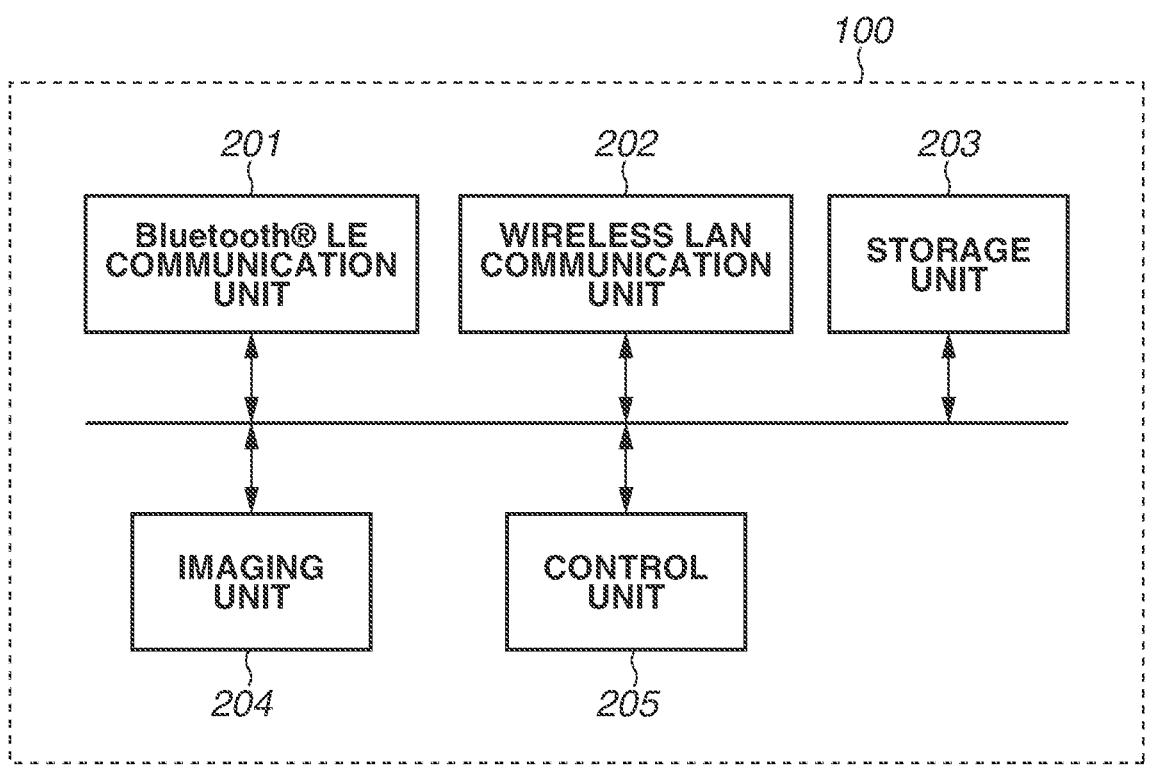
FIG. 2 is a diagram illustrating a configuration of the imaging apparatus according to the first embodiment of the present invention.

FIG. 2 is a diagram illustrating a configuration of the imaging apparatus 100. The imaging apparatus 100 includes a Bluetooth® Low Energy (LE) communication unit 201 for Bluetooth® LE as the first communication path and a wireless local area network (LAN) communication unit 202 for a wireless LAN (hereinafter called Wi-Fi) in conformity with IEEE802.11 standard series as the second communication path, and communicates with the communication apparatus 110. In the following description, Bluetooth® LE and wireless LAN are given as examples of wireless communication technologies used for the first and second communication paths. However, the invention is not limited to such communication technologies and other wireless communication technologies may be used. For example, other short range or low speed communication technologies such as Zigbee or infrared communication may be used for the first communication path and other wireless communication technologies supporting higher data rates or higher speeds, such as cellular communication technologies, may be used for the second communication path.

A storage unit 203 stores various types of information, such as communication programs to be executed by a control unit 205 and parameters for communication. Digital image data output from an imaging unit 204 is converted by the control unit 205 into a recording format, such as JPEG or MPEG, and is recorded on the storage unit 203.

The imaging unit 204 receives light passed through a lens group and incident on an imaging element, and outputs information on an electric charge according to an amount of the light, as digital image data to the control unit 205. The imaging element is generally a complementary metal oxide semiconductor (CMOS) or a charge coupled device (CCD).

The control unit 205 controls the entire imaging apparatus 100 by executing the control programs stored in the storage unit 203, and is implemented by, for example, a central processing unit (CPU). Various operations by the imaging apparatus 100 described below are achieved by the control unit 205 executing the control programs stored in the storage unit 203. In place of the control unit 205 controlling the entire imaging apparatus 100, a plurality of hardware units may share processing to control the entire imaging apparatus 100.

After determination of a notification to be transmitted, the control unit 205 transmits the notification to the communication apparatus 110 by the Bluetooth® LE communication unit 201 and the wireless LAN communication unit 202 as a notification transmission unit.

Figure 3:
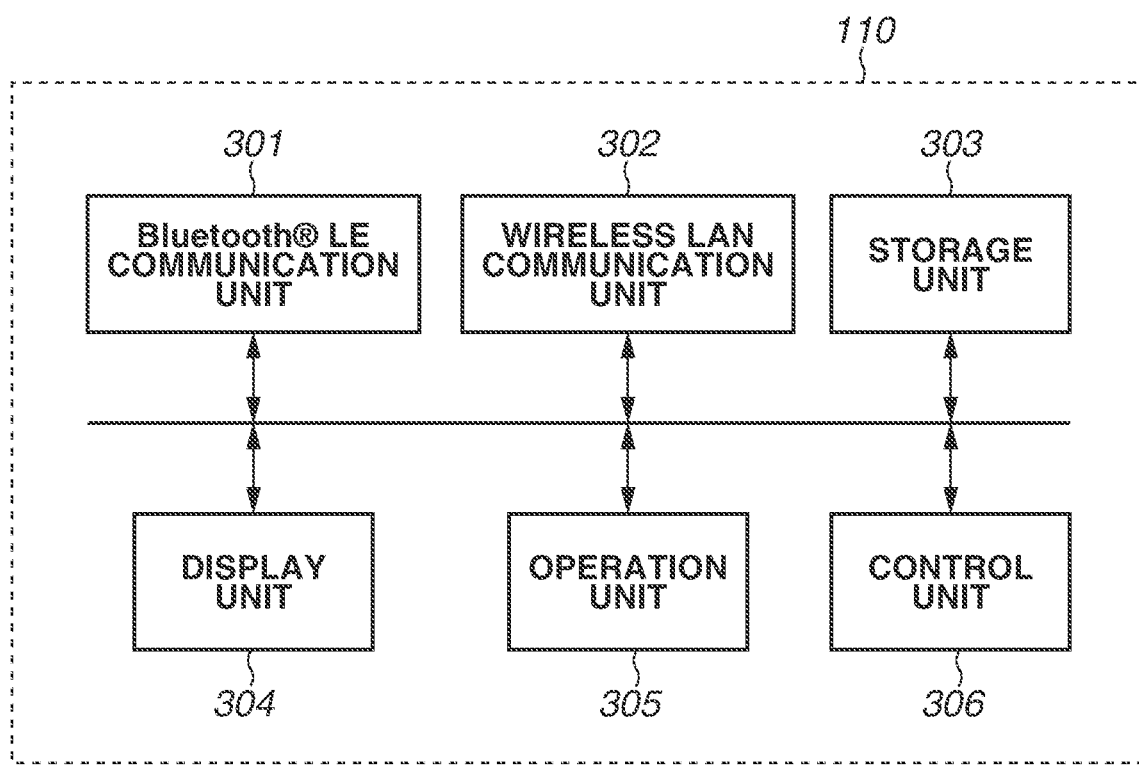
FIG. 3 is a diagram illustrating a configuration of the communication apparatus according to the first embodiment of the present invention.

FIG. 3 is a diagram illustrating a configuration of the communication apparatus 110. The communication apparatus 110 includes a Bluetooth® LE communication unit 301 and a wireless LAN communication unit 302 that are equivalent to the Bluetooth® LE communication unit 201 and the LAN communication unit 202 of the imaging apparatus 100, respectively, and the imaging apparatus 100 and the communication apparatus 110 communicate with each other using these communication units.

A storage unit 303 stores various types of information, such as communication programs to be executed by a control unit 306 and parameters for communication.

A display unit 304 has, for example, a function of outputting visually recognizable information using, for example, an LCD or an LED, or a function of outputting sound using, for example, a speaker, and displays various types of information.

An operation unit 305 includes buttons, for example, that accept user operations on the communication apparatus 110. In the present embodiment, the display unit 304 and the operation unit 305 are included in a touch panel and thus are configured as a common member.

The control unit 306 controls the entire communication apparatus 110 by executing the control programs stored in the storage unit 303 and is implemented by a CPU, for example. Various operations by the communication apparatus 110 described below are achieved by the control unit 306 executing the control programs stored in the storage unit 303. In place of the control unit 306 controlling the entire communication apparatus 110, a plurality of hardware units may share processing to control the entire communication apparatus 110.

Next, a processing procedure from transmission and reception of an image-attached notification between the imaging apparatus 100 and the communication apparatus 110 to displaying the notification to the user will be described with reference to FIG. 4 and FIGS. 5A and 5B. According to the present embodiment, the imaging apparatus 100 and the communication apparatus 110 have been powered on in advance and a communication using Bluetooth® LE has been already established between the imaging apparatus 100 and the communication apparatus 110.

Figure 4:
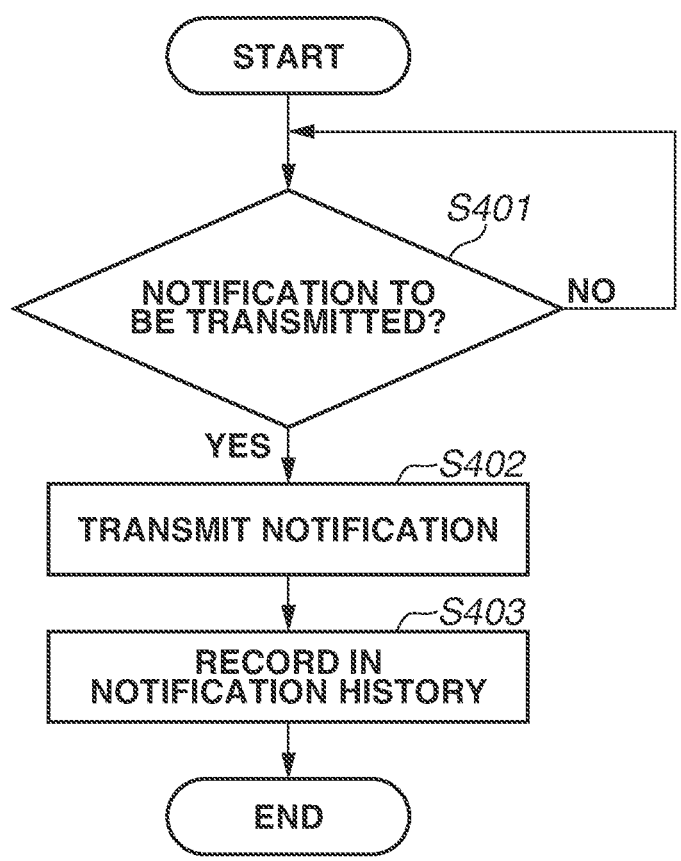
FIG. 4 is a flowchart illustrating processing during transmission of a notification by the imaging apparatus according to the first embodiment of the present invention.

FIG. 4 is a flowchart illustrating a processing procedure of transmitting a notification by the imaging apparatus 100. FIG. 5A is a flowchart illustrating a processing procedure of receiving the notification by the communication apparatus 110, and FIG. 5B is a flowchart illustrating a processing procedure of switching a communication path by the communication apparatus 110 from a communication using Bluetooth® LE to a communication using Wi-Fi.

First, the processing procedure illustrated in the flowchart of FIG. 4 will be described. The steps in the flowchart are executed by the control unit 205 controlling each unit of the imaging apparatus 100. However, the steps will be described below as being executed by the imaging apparatus 100 for ease of understanding. The processing procedure is started in a state where the imaging apparatus 100 and the communication apparatus 110 are connected with each other via a communication using Bluetooth® LE or a wireless LAN.

First, in step S401, the imaging apparatus 100 determines whether an event to be notified to the user has occurred in an image capturing status or a state of a housing of the imaging apparatus 100. Examples of the event includes recommended image selection which is executed on a condition that the number of captured images reaches a predetermined number, low battery of the imaging apparatus 100 at or below a predetermined level, low memory capacity of a recording medium at or below a predetermined level, and the like. Examples of the event also includes detection of an image capturing status in a imaging result where imaging has been performed on a backlighted subject, performed in a dark place, or performed at an excessively low position, and the like.

Whether the number of captured images reaches the predetermined number is determined by counting the number of captured images every time when imaging is performed. In a case where a notification is transmitted in response to the event, the counting is reset, and then the number of captured images is started again. In a case where the number of captured images reaches the predetermined number, processing of selecting a user's recommended image from among the captured images is also executed. In a case where a user's recommended image is selected as a result of the processing, the imaging apparatus 100 determines that an event for the recommended image occurs, in response to completion of the selection. Whether the battery is low is determined by detecting changes in voltage. Whether a memory capacity of the recording medium is low is determined every time when an image is captured and the captured image is stored. Whether imaging has been performed on a backlighted subject, performed in a dark place, or performed at an excessively low position is determined based on an analysis performed by the control unit 205 using a captured image.

In a case where an event to be notified has occurred (YES in step S401), the processing proceeds to step S402. In step S402, the imaging apparatus 100 creates a notification message and transmits a notification to the communication apparatus 110. The notification transmitted by the imaging apparatus 100 is any one of notifications predetermined in different types. The notification types each corresponding to a different event is predetermined in a table (not illustrated). For example, in a case of an occurrence of an event in which a user's recommended image is selected, a notification of a type for image acquisition is transmitted. In a case of an occurrence of an event in which the battery is low or a memory capacity of the recording medium is low, a notification of a type for state notification is transmitted. In a case of an occurrence of an event in which imaging has been performed on a backlighted subject, performed in a dark place, or performed at an excessively low position, a notification of a type for an error is transmitted. Based on the notification type, whether an image is to be attached to or associated with a notification is determined. In a case where a notification to be transmitted is an image-attached notification, a notification message of the notification includes an image ID that is image identification information for uniquely identifying a corresponding image saved in the storage unit 203. In the present exemplary embodiment, a notification of the type for image acquisition is determined as a type for which an image is to be attached to or associated with a notification, and a notification of the type for state notification or the type for an error is determined as not a type for which an image is to be attached to or associated with a notification.

The image ID may be an any numeric value, a directory number and a file number in accordance with a camera file system standard, a universally unique identifier (UUID) assigned to the image, or the like.

In step S403, the imaging apparatus 100 records information on the transmitted notification on the storage unit 203 serving as a notification history recording unit. The information recorded here will be called notification history. The notification history holds a certain number of pieces of information on one or more notifications for events occurred in the past.

The processing procedure in the flowchart of FIG. 5A will be described. The steps in the flowchart are executed by the control unit 306 controlling each unit of the communication apparatus 110. However, the steps will be described below as being executed by the communication apparatus 110 for ease of understanding. The processing procedure is started in a state where the imaging apparatus 100 and the communication apparatus 110 are connected with each other via a communication using Bluetooth® LE or a wireless LAN.

First, in step S501, the communication apparatus 110 is on standby to receive the notification massage transmitted from the imaging apparatus 100. In step S502, the communication apparatus 110 receives the notification massage (for example, at a reception means or unit of the communication apparatus 110 which may be part of the control unit 306 and/or the Bluetooth® LE communication unit 301 or the wireless LAN communication unit 302). After the receipt of the notification massage, in step S503, the communication apparatus 110 checks a communication path status. In a case where Bluetooth® LE is used for the connection (YES in step S503), the processing proceeds to step S504. In step S504, the communication apparatus 110 displays the notification of a character string on the display unit 304. The character string to be displayed as the notification is obtained by retrieving a notification number as a notification content identifier from the notification message, and acquiring the character string(s) with reference to a notification character string table illustrated in FIG. 9. In this process, even in a case where the received notification massage is an image-attached notification, an image is not displayed but the notification character string corresponding to the notification number included in the notification message is displayed.

On the other hand, in a case where Wi-Fi is used for the connection (NO in step S503), the processing proceeds to step S505. In step S505, the communication apparatus 110 receives an image by an image acquisition unit using the image ID included in the received notification message, and in step S506, the communication apparatus 110 displays the image-attached notification. The image acquisition unit is provided by the control unit 306 and inquires of the imaging apparatus 100 about the image using the image ID received from the imaging apparatus 100, and acquires the image via the wireless LAN communication unit 302.

The processing procedure of the flowchart of FIG. 5B will be described. The steps in the flowchart are executed by the control unit 306 controlling each unit of the communication apparatus 110. However, the steps will be described below as being executed by the communication apparatus 110 for the ease of understanding. The processing procedure is started in a state where the imaging apparatus 100 and the communication apparatus 110 are connected with each other via a communication using Bluetooth® LE or a wireless LAN.

In a case where Bluetooth® LE is used for the connection, in step S510, the communication apparatus 110 is on standby for a timing for switching the communication path to Wi-Fi. In a case where a condition for switching the communication path to Wi-Fi is satisfied (YES in step S510), the processing proceeds to step S511. In step S511, the communication apparatus 110 switches the communication path from Bluetooth® LE to Wi-Fi by a communication path switching unit (or switching means). The timing for switching the communication path to Wi-Fi (the condition for switching the communication path to Wi-Fi) is when a dedicated application for operating the imaging apparatus 100 is activated by a user operation and the application starts operating in the foreground of the communication apparatus 110.

The switching of the communication path is performed by so-called handover. Specifically, when the dedicated application for operating the imaging apparatus 100 starts operating in the foreground of the communication apparatus 110, the communication apparatus 110 uses Bluetooth® LE to send a request for switching the communication path to Wi-Fi to the imaging apparatus 100. Upon receipt of the request, the imaging apparatus 100 uses Bluetooth® LE to transmit a network parameter for Wi-Fi to the communication apparatus 110. The network parameters here include an SSID and a password. Further, the imaging apparatus 100 generates a Wi-Fi network. Specifically, the imaging apparatus 100 starts broadcasting a beacon including the SSID having been transmitted to the communication apparatus 110 using Bluetooth® LE, and waits for a request for participation in the Wi-Fi network from the communication apparatus 110. Meanwhile, upon receipt of the network parameter including the SSID and the password, the communication apparatus 110 requests participation in the Wi-Fi network generated by the imaging apparatus 100. When the imaging apparatus 100 permits the participation of the communication apparatus 110, the connection using Wi-Fi between the imaging apparatus 100 and the communication apparatus 110 is established. Accordingly, the switching of the communication path from Bluetooth® LE to Wi-Fi is completed.

After the switching of the communication path to Wi-Fi, in step S512, the communication apparatus 110 receives a notification history from the imaging apparatus 100 by a notification history acquisition unit. The notification history acquisition unit is provided by the control unit 306, and sends a notification history request to the imaging apparatus 100 to receive the notification history recorded on the storage unit 203 of the imaging apparatus 100.

All notifications recorded in the notification history may be transmitted by the imaging apparatus 100. However, information to be used in the first embodiment is information on the latest notification as described below, and thus it is preferable to transmit the latest notification in the notification history.

After receipt of the notification history, in a case where the notification message includes an image ID, in step S513, the communication apparatus 110 acquires a corresponding image from the imaging apparatus 100 by the image acquisition unit. Finally, in step S514, the communication apparatus 110 displays the image-attached notification using at least a portion of the received image.

FIG. 6 is a diagram illustrating the notification history stored by the imaging apparatus 100 (step S403) when a notification is transmitted. One notification is represented in one line, and each time a new notification is transmitted, one new line is added to the top of the history to record information. Notification number is a number for uniquely identifying a type of the corresponding notification. Occurrence date and time is a date and time when the notification has occurred. Information on occurrence date and time is recorded using a character string or a numeric value indicating the date and time. Image ID is image identification information indicating an image attached to or associated with the notification in the present embodiment. The image ID is an identifier for uniquely identifying an image recorded in the imaging apparatus 100. Image ID is recorded with a numeric value for uniquely specifying an image or a file path or address indicating a location of the image.

Image IDs are not necessarily recorded for all notifications. Non-image-attached notifications have no corresponding images, and thus image IDs are not recorded for non-image-attached notifications. A line having a notification number 1 in FIG. 6 represents such a case. On the other hand, the notifications having notification numbers 2 and 3 are image-attached notifications.

Information in a notification may include any information, other than the above described information, to be stored as notification information. Examples of information include identifiers for identifying a specific person, a specific time period, error information, and the like. These pieces of information may not be included in all notifications but may be included as a combination of pieces of information to be used.

FIG. 7 is a diagram illustrating a notification message transmitted using Bluetooth® LE. The message includes a notification number, an occurrence date and time, a directory number and a file number as an image ID. The notification number and the occurrence date and time are as described above with reference to FIG. 6. The directory number and the file number are provided in accordance with the camera file system standard, and these numbers are used to identify a unique image file by combining the numbers. For example, the image file with the directory number of "100" and the file number of "1" described in FIG. 7 is identified as "DCIM/100xxxxx/yyyy0001.zzz" where xxxxx and yyyy are arbitrary character strings determined by a design of the imaging apparatus 100, and zzz is a file extension.

The message described in FIG. 7 is a mere example and the notification is not limited to this form. For example, the message may not include the occurrence date and time. The image ID may be represented by some numeric value or character string. However, since the data amount of message transmittable using Bluetooth® LE is limited, it is desirable to reduce the data amount as much as possible. Consequently, the image ID is more desirably represented by a numeric value, rather than by a character string.

FIG. 8 is a diagram illustrating a notification message transmitted using Wi-Fi. The message is represented in a JavaScript Object Notation (JSON) format and includes a notifyno variable as a notification number, a date variable as an occurrence date and time, and an imageid variable as an image ID. The notifyno variable indicates the notification number by a numeric value. The date variable indicates information on the date and time by a character string. The imageid variable indicates a file path representing an image file location by a character string.

The message described in FIG. 8 is a mere example, and is not limited to this form but may be represented in a format other than a JSON format or by a number sequence. The message may not include the occurrence date and time. The imageid variable may be represented in a manner similar to that of the message for Bluetooth® LE.

In the present embodiment, information on the same content is transmitted even in different formats in accordance with the case using Bluetooth® LE and Wi-Fi. However, information transmitted using Bluetooth® LE and information transmitted using Wi-Fi can be different contents from each other. For example, among pieces of notification information transmitted using Bluetooth® LE, a directory number and a file number as an image ID are not used for notification display, and thus these pieces of information can be omitted.

Figure 10:
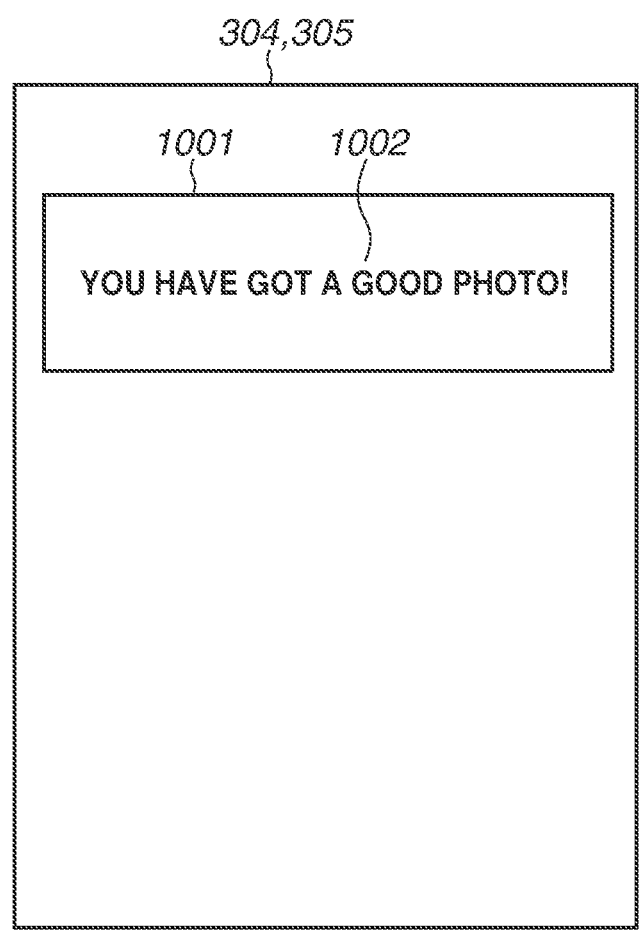
FIG. 10 is a diagram illustrating display of a notification transmitted via a communication using Bluetooth® LE according to the first embodiment of the present invention.

Next, a notification displayed on the communication apparatus 110 will be described with reference to FIGS. 10 and 11. FIG. 10 illustrates a notification displayed in step S504 in FIG. 5A, and FIG. 11 illustrates a notification displayed in steps S506 and S514 in FIGS. 5A and 5B.

In the present embodiment, when a notification is displayed in step S504, the dedicated application has not been started and the notification is displayed using a notification function provided by an operating system in the communication apparatus 110, such as a smartphone. FIG. 10 illustrates a notification area 1001 where the notification is displayed and a notification character string 1002.

Figure 11:
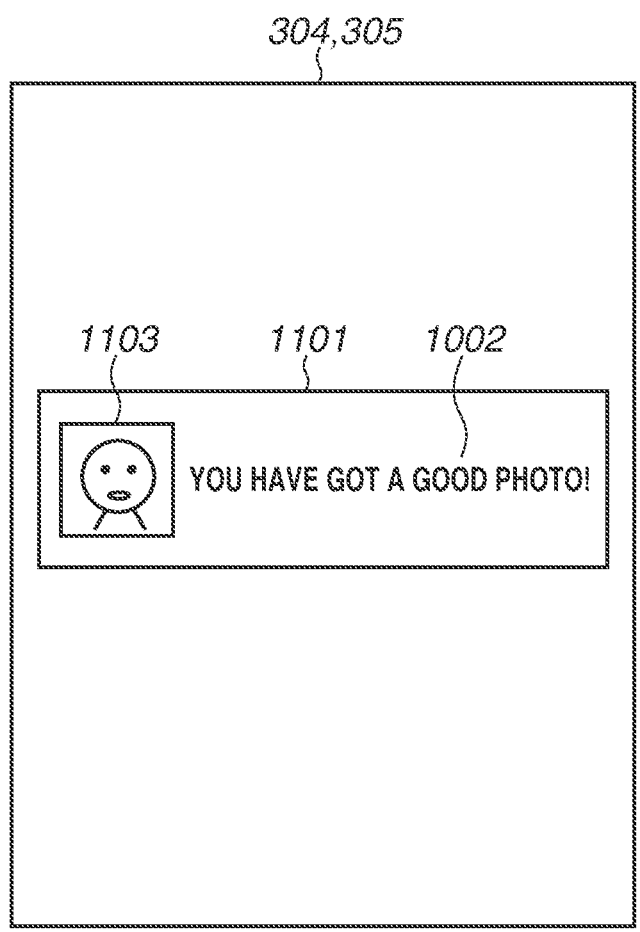
FIG. 11 is a diagram illustrating display of a notification transmitted via Wi-Fi according to the first embodiment of the present invention.

Next, when the user presses the notification area 1001 or an icon of the dedicated application to start the dedicated application, the notification is displayed in the dedicated application as illustrated in FIG. 11. A notification display area 1101 is an area in the dedicated application as illustrated in FIG. 11. A notification character string 1102 is the character string (text) described above with reference to FIG. 10. An attached image 1103 acquired by using the image ID included in the notification message (steps S505 and S513) is also displayed.

The notification display area 1101 or the attached image 1103 can be pressed as a button by the user, and a function to be activated by pressing the button may be displaying the attached image 1103 in an enlarged size or moving the attached image 1103 to a screen for displaying a list of other high-quality photographs.

The description has been given of the method for recording a notification in the notification history using a timing of after transmission of the notification from the imaging apparatus 100 to the communication apparatus 110 as a timing for recording the notification in the notification history. However, the timing for recording is not limited to this. For example, an event to be notified may occur in a state where neither Bluetooth® LE nor Wi-Fi is used for a connection. In such a case, a notification may be recorded in the notification history upon an occurrence of an event to be notified.

In the method described above, all notifications transmitted are recorded in the notification history. However, notifications to be recorded in the notification history may be selected in accordance with the types of notifications or under other conditions.

The description has been given of the method in which, when an image is associated with a notification history and a notification is acquired by a communication path using Wi-Fi, the notification history is acquired first, and then image identification information included in the notification history is used to acquire the image. Alternatively, the notification history to which the image information is directly attached may be transmitted and received. In this case, the image information may be recorded directly in the notification history recorded on the storage unit 203, or the image identification information may be recorded in the notification history recorded on the storage unit 203, and then the corresponding image may be read from the storage unit 203 and attached to the notification history at the time of transmission of the notification history.

In the present embodiment, in a communication using low-speed Bluetooth® LE, the user operates an application other than the dedicated application on the communication apparatus 110, such as a smartphone. In many cases, a smartphone provides a service via some communication with a communication target different from the imaging apparatus 100. Consequently, forcibly changing the communication path by the application running in the background may interfere with the user operation. Thus, in the present embodiment, while the notification system is operating in the background, a minimal communication is performed to avoid interference with the user operation. Further, as described above, when the notification system shifts to the foreground according to a user operation, the notification system switches to the higher-speed communication path to receive and provide sufficient information to be presented to the user based on the history information.

According to the present embodiment, it is possible to provide a communication system that is capable of appropriately presenting an image-attached notification to the user by the function of displaying the image-attached notification, without interfering with the user operation due to switching of a communication path.

In the first embodiment, when the dedicated application for the communication apparatus 110 is started and the communication apparatus 110 is connected to a Wi-Fi network, the latest notification is displayed again. However, the user may wish to check more notifications far back into the recorded notification history.

In a second embodiment, a description will be given of a method in which, when the dedicated application for the communication apparatus 110 is started and the communication apparatus 110 is connected to a Wi-Fi network, all notifications recorded in the notification history in the imaging apparatus 100 is displayed again. A description will be also given of a method of data transmission and reception involved in displaying of the notification history.

A system configuration in the second embodiment is the same as that in the first embodiment, and thus redundant description thereof will be omitted. Differences from the first embodiment will be described below.

Figure 12:
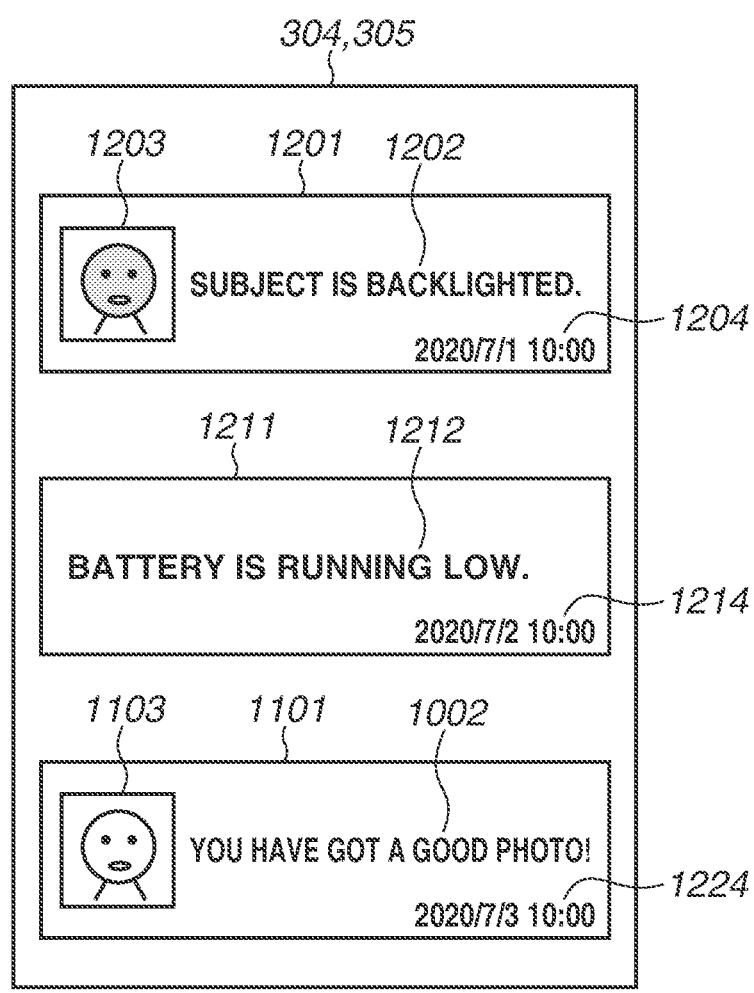
FIG. 12 is a diagram illustrating a notification history screen according to a second embodiment of the present invention.

FIG. 12 is a diagram describing a history screen as a history display unit. The history screen is displayed on the display unit 304 of the communication apparatus 110, where notifications having occurred in the past are displayed in list form. FIG. 12 represents a screen display of the notification history illustrated in FIG. 6 in chronological order from the top of the list. Notification occurrence dates and times (1204, 1214, and 1224) are displayed in notification display areas 1201, 1211, and 1101, respectively.

The notification display area 1201 is an area for the oldest notification, and includes a text 1202 and an image 1203. The text 1202 indicates that an imaged subject is backlighted at a timing of the notification, and the image 1203 is an image in an angle of view of the imaging unit 204 at the timing of the notification.

The notification display area 1211 is an area for the second oldest notification and includes a text 1212 indicating that a battery of the imaging apparatus 100 is running low. In a case of a non-image-attached notification like the case seen in the notification display area 1211, a character string is displayed without an image.

The number of notifications displayed on the history screen is not limited to three but all notifications recorded on the imaging apparatus 100 may be displayed. The history screen may have a function of scrolling through the history by a user operation.

In the example described above, notification occurrence dates and times are displayed in a year-month-date-time format. However, the display format of notification occurrence dates and times is not limited to this. For example, a time elapsed from a notification occurrence may be displayed, and in that case, the time displayed may be rounded such as "one minute before" or "two days before".

Figure 13:
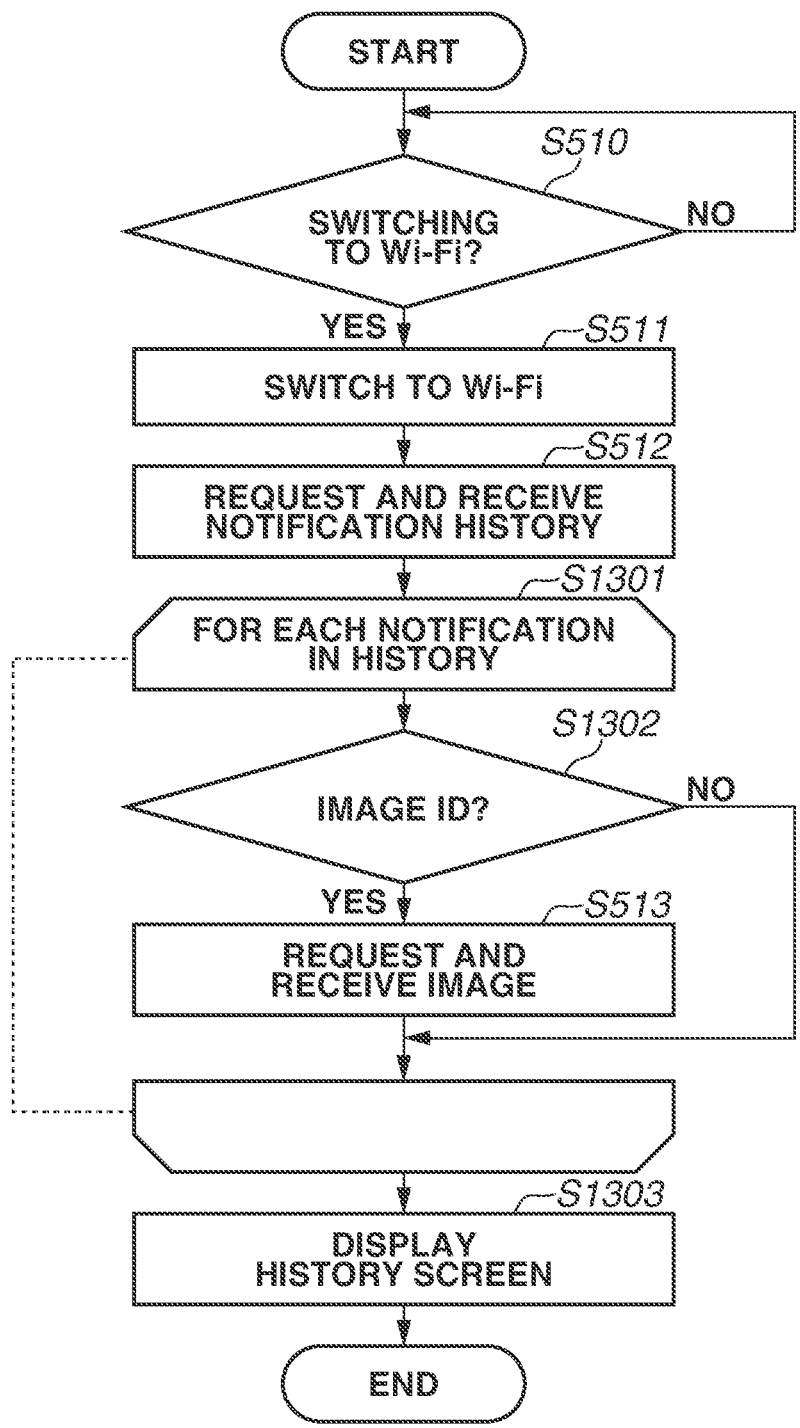
FIG. 13 is a flowchart illustrating a processing procedure of displaying the notification history screen according to the second embodiment of the present invention.

FIG. 13 is a flowchart illustrating a behavior of the communication apparatus 110 in a case where the history screen with a plurality of notifications in the notification history is displayed. Since FIG. 13 has many similarities to FIG. 5B, differences will be described.

In step S512, the communication apparatus 110 receives the notification history, and then in step S1302, the communication apparatus 110 determines whether image IDs are attached to all notifications included in the notification history. In a case where the image IDs are attached to all notifications (YES in step S1302), the processing proceeds to step S513. In step S513, the communication apparatus 110 requests an image, and a loop of step S1301 iterates for all the notifications.

After acquisition of images attached to all notifications, in step S1303, the communication apparatus 110 displays the history screen.

In the case of displaying the notification history screen as illustrated in FIG. 12, in general, the communication apparatus 110 records the received notifications and uses the recorded information at the time of screen display. However, in the case of transmitting and receiving a notification including heavy data in a low-speed communication path, the aforementioned display method is impractical because it will take much time to acquire the data or the user has to allow a data gap. In the present embodiment, the description has been given of the method in which the imaging apparatus 100 stores the notification occurrence history, and once the high-speed communication path becomes available, transmitting and receiving a large amount of data is performed.

In the present embodiment, as described above, after the dedicated application in the communication apparatus 110 is started and connected to a Wi-Fi network, all notifications in the notification history recorded on the imaging apparatus 100 are displayed again. However, the timing for displaying the notification history screen is not limited to this. For example, after the start of the dedicated application, the notification history screen may be called by a user operation.

According to the present embodiment, it is possible to provide a communication system that can appropriately present image-attached notifications occurred in the past to the user by the function of displaying the history of image-attached notifications.

An imaging apparatus 100 in a third embodiment will be described. A description will be given of a case where an image indicated by image identification information included in the notification history has been already deleted at the time of transmission of the notification history, the imaging apparatus 100 changes a notification history.

The imaging apparatus 100 has an image deletion unit that deletes an image from the storage unit 203. The image deletion unit has functions of, for example, deleting an image selected by the user, deleting all recorded information from the storage unit 203, automatically deleting a poor-quality photo image for continuing automatic image capturing, and the like. For example, the user can display a list of images saved in the imaging apparatus 100 by a function of a dedicated application installed in the communication apparatus 110 and input an instruction for deleting an image selected by the user from the list. In this case, upon receipt of the instruction for deleting an image, the dedicated application (for example, the dedicated application may include a deletion means or function) instructs the imaging apparatus 100 to delete the image. The image deletion unit may also delete an image to be attached to a notification described above in relation to the first and second embodiments.

In the above described case, there may be no image to be used in displaying a notification. Thus, the notification may be displayed in an incomplete state without no image to be displayed together with the notification. The present embodiment is a solution to such an issue.

A system configuration in the third embodiment is the same as those in the first and second embodiments, and thus redundant description thereof will be omitted. Differences from the first and second embodiments will be described below.

FIG. 14 is a flowchart illustrating a processing procedure from receipt of a request for a notification history to transmission of the notification history by the imaging apparatus 100. In step S1401, the imaging apparatus 100 is on standby to receive a notification history request from the communication apparatus 110. After the receipt of the notification history request, in step S1402, the imaging apparatus 100 reads the notification history from the storage unit 203, and in step S1403, the imaging apparatus 100 uses image IDs included in information of notifications in the history to determine whether the corresponding images are in the storage unit 203. In this processing, while all the notifications included in the notification history are checked simply for presence of corresponding images, according to the present invention, it is more desirable to refer to notification numbers of the notifications and perform the checking of presence of corresponding images for image-attached notifications.

In a case where there is no image indicated by an image ID, that is, in a case where the image has been deleted by some unit (YES in step S1403), the processing proceeds step S1404. In step S1404, the imaging apparatus 100 deletes an item of the corresponding notification from the notification history. The imaging apparatus 100 checks presence of an image each for all the notifications with image IDs recorded in the notification history, and then in step S1405, the imaging apparatus 100 transmits the remaining information in the notification history to the communication apparatus 110.

In the present embodiment, the description has been given of the method of displaying the history screen where there is no image corresponding to an image-attached notification. However, a similar method can be used for a notification display screen as described above in relation to the first embodiment. In this case, in a case where the latest notification is deleted, the previous notification may be displayed as the latest notification or a message indicating that there is no notification to be displayed may be presented.

According to the present embodiment, it is possible to provide the function of preventing display inconsistency in displaying an image-attached notification in a case where no image corresponding to the image-attached notification is present.

While the description has been given of the case where data attached to a notification is an image in the first to third embodiments, sound, movies, or other data can be attached to a notification.

Preferred embodiments of the present invention have been described so far. However, the present invention is not limited to these embodiments and is defined by the accompanying claims.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments and is defined by the accompanying claims.

This application claims the benefit of Japanese Patent Application No. 2020-160152, filed Sep. 24, 2020, which is hereby incorporated by reference herein in its entirety.

What is claimed is:

1. A communication apparatus comprising:
one or more processors;
a first communication interface;
a second communication interface; and
a control unit configured to wirelessly communicate with an imaging apparatus via the first communication interface and to wirelessly communicate with the imaging apparatus via the second communication interface,
wherein the control unit receives a notification from the imaging apparatus,
wherein the control unit controls, based on whether the received notification is received via the first communication interface or the second communication interface, whether to perform displaying the received notification with at least a portion of an image received from the imaging apparatus or displaying the received notification without the image received from the imaging apparatus, and
wherein the control unit is implemented by the one or more processors.

2. The communication apparatus according to claim 1, wherein, in a case where the notification is received via the second communication interface and the received notification includes information for specifying an image, the control unit requests the image from the imaging apparatus via the second communication interface based on the information for specifying the image, and upon receipt of the requested image, performs control for displaying the received notification with at least a portion of the image received from the imaging apparatus.

3. The communication apparatus according to claim 1, wherein, in a case the notification is received via the first communication interface and the received notification includes information for specifying an image, the control unit performs control for displaying the received notification without the image received from the imaging apparatus.

4. The communication apparatus according to claim 1, wherein the control unit switches between a state of being connected to the imaging apparatus via the first communication unit interface and a state of being connected to the imaging apparatus via the second communication interface, and
wherein, in a case where the control unit performs switching from the state of being connected to the imaging apparatus via the first communication interface to the state of being connected to the imaging apparatus via the second communication interface, the control unit requests information about a notification history from the imaging apparatus.

5. The communication apparatus according to claim 4, wherein the control unit deletes an image stored in the imaging apparatus, and
wherein a notification corresponding to the image deleted by the control unit is not included in the information about the notification history.

6. A control method of a communication apparatus including a first communication interface and a second communication interface, the control method comprising:
receiving a notification from the imaging apparatus; and
controlling, based on whether the received notification is received via the first communication interface or the second communication interface, whether to perform displaying the received notification including at least a portion of an image received from the imaging apparatus or displaying the received notification without the image received from the imaging apparatus.

7. The control method of the communication apparatus according to claim 6, wherein, in a case where the notification is received via the second communication interface and the received notification includes information for specifying an image, the controlling includes requesting the image from the imaging apparatus via the second communication interface based on the information for specifying the image, and upon receipt of the requested image, performing control for displaying the received notification with at least a portion of the image received from the imaging apparatus.

8. The control method of the communication apparatus according to claim 6, wherein, in a case where the notification is received via the first communication interface and the received notification includes information for specifying an image, the controlling includes performing control for displaying the received notification without the image received from the imaging apparatus.

9. The control method of the communication apparatus according to claim 6, further comprising:
switching between a state of being connected to the imaging apparatus via the first communication interface and a state of being connected to the imaging apparatus via the second communication interface,
wherein, in a case where the switching is performed from the state of being connected to the imaging apparatus via the first communication interface to the state of being connected to the imaging apparatus via the second communication interface, the controlling includes requesting information about a notification history from the imaging apparatus.

10. The control method of a communication apparatus according to claim 9, further comprising:
deleting an image stored in the imaging apparatus,
wherein a notification corresponding to the deleted image is not included in the information about the notification history.

11. A non-transitory computer-readable storage medium which stores a program comprising instructions which, when the program is executed by a computer, cause the computer to execute the method according to claim 6.

* * * * *